April 2, 1940.     A. LEBER     2,195,748
OPTICAL EXPOSURE METER
Filed May 4, 1939
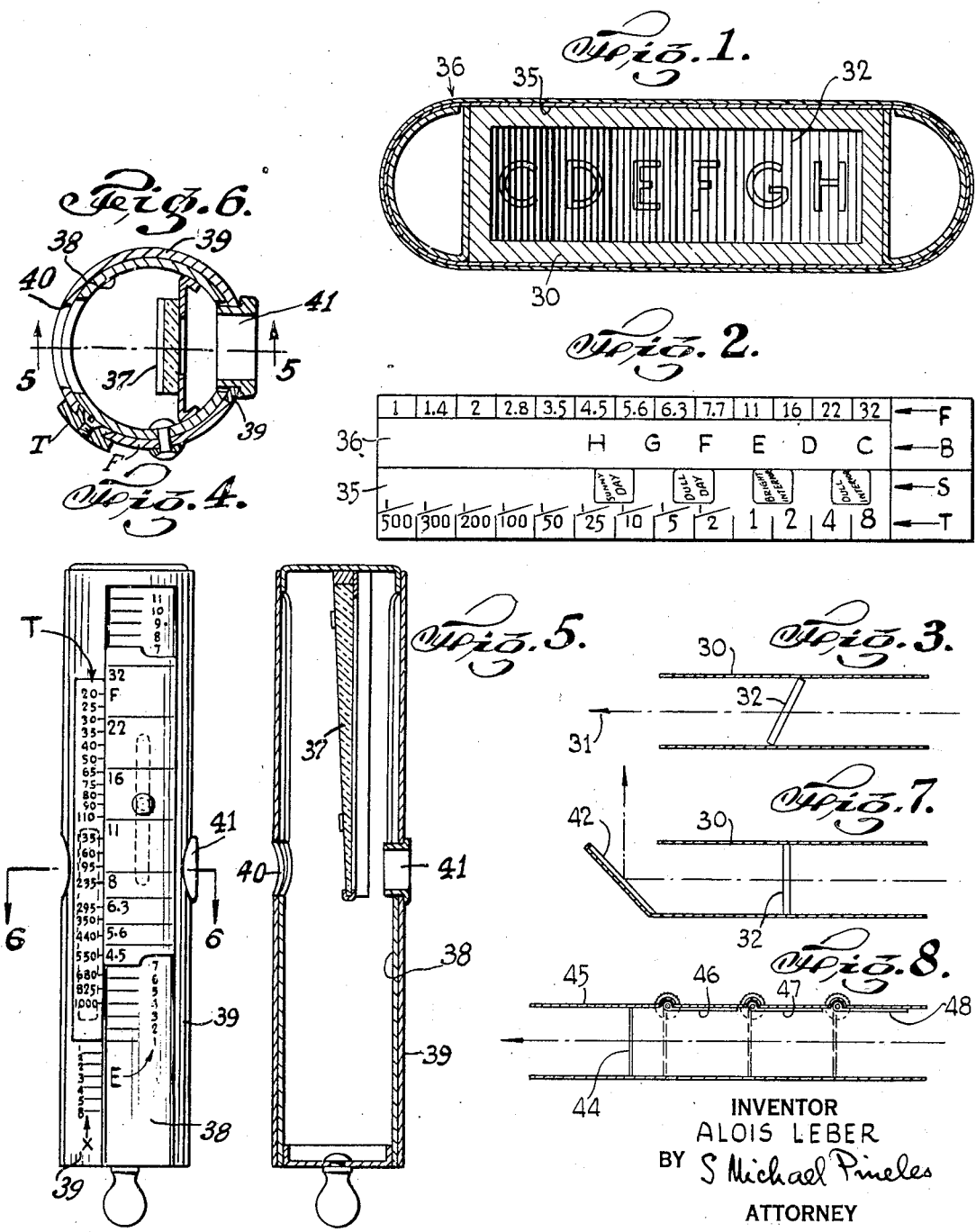
INVENTOR
ALOIS LEBER
BY S Michael Pineles
ATTORNEY Patented Apr. 2, 1940

2,195,748

UNITED STATES PATENT OFFICE 2,195,748

OPTICAL EXPOSURE METER

Alois Leber, Vienna, Germany

Application May 4, 1939, Serial No. 271,800
In Austria December 9, 1933

7 Claims. (Cl. 88—23)

This application is a continuation-in-part of my copending application Serial No. 736,773, filed July 24, 1934.

This invention relates to optical exposure meters and more particularly to optical exposure meters of the extinction or light wedge type for determining by the visual acuity of the observer's eye the exposure data required to make a photograph.

Among the objects of the invention is an exposure meter of such type in which a light wedge and an exposure data table are combined with means for compensating for the differences of the acuity of vision of the observer's eye held at a distance from the exposure meter and exposed to surrounding light conditions so as to make possible the determination of the correct exposure data under elimination of the undesirable eyepieces heretofore considered essential for satisfactory light wedge exposure meters.

The foregoing and other objects of the invention will be best understood from the following description of exemplifications thereof, reference being had to the accompanying drawing, wherein Fig. 1 is an end view of the exposure meter exemplifying the invention;

Fig. 2 is an exposure data table of the type used in prior exposure meters, modified in accordance with the principles of the invention for the exposure meter of Fig. 1;

Fig. 3 is a diagrammatic sectional view of an exposure meter of Fig. 1 along its optical axis of vision;

Fig. 4 is a side view of a prior art exposure meter modified in accordance with the invention;

Fig. 5 is a vertical sectional view of the exposure meter of Fig. 4;

Fig. 6 is a horizontal sectional view along lines 6—6 of Fig. 4; and

Figs. 7 and 8 are views similar to Fig. 3 illustrating other ways for modifying prior art exposure meters in accordance with the principles of the invention.

The idea underlying extinction-type or light wedge exposure meters for determining by the visual acuity or the sharpness of vision of the observer's eye, the exposure data required for making a photograph of an object is old.

Thus, for instance, Curtis Patent 1,176,349 discloses an exposure meter composed of an open-ended casing serving as a light passage in which is located a light wedge having areas of gradually decreasing translucency forming a brightness value scale on which the observer's eye, held at a distance from the casing, reads off the brightness value of the object, and a calculating table formed of a scale of stop values, a scale of exposure times, and a brightness scale marking correlating the light wedge readings to the exposure data of the table so as to give for each brightness reading made by the eye on the light wedge, the combinations of exposure data, namely, the stop values and exposure times required to make a photograph of the object. It was also known to design the calculating table of such visual exposure meters in the form of a slider table arranged so that by bringing the index mark of one table section opposite the brightness value mark of the other table section, corresponding to the brightness value observed on the light wedge, the aligned exposure data on the two table sections give the combinations of exposure data required to make the photograph.

Such prior exposure meters proved unsatisfactory because the visual sensitivity of the observer's eye, making the light wedge reading, changes, depending on the variations in the surrounding light conditions to which the eye is exposed. To overcome the inaccuracy of such prior visual exposure meters caused by the changes in the visual sensitivity of the observer's eye making the light wedge reading while the eye is exposed to different surrounding light conditions, the prior commercial light-wedge exposure meters have been provided with an eyecup, for instance, in the way illustrated in Aiken Patent 1,414,972, so as to cut off all external light from the eye and force the eye which makes the light-wedge reading to assume a standard condition of visual sensitivity.

Various modifications of such eyepiece light wedge exposure meters shown, for instance, in Mayer Patent Re. 16,879 or Bing Patent 1,864,180 have been on the market for a number of years past, differing in minor details and using various auxiliary scales, such as emulsion speed and filter factor scales, requiring preliminary adjustment to compensate for the variable factors which determine the combination of the stop values and exposure times required to make a good photograph. However, such prior eyepiece exposure meters have inherent disadvantages. Thus, a variable time interval has to elapse before the observer's eye brought into the darkened space of the eyecup reaches its final state of accommodation. As a result, the user is not quite sure whether his eye has reached its standard accommodation, and the brightness value readings on the light wedge are often inaccurate. In addition, the eyecup imposes a strain on the eye, particularly if after having itself accommodated to the darkened space of the eyecup, the eye is suddenly exposed to brilliant sunshine while making the exposure.

The object of the invention is a visual-acuity or sharpness-of-vision exposure meter which estimates the momentary visual sensitivity of the eye which makes the light wedge reading, as determined by the surrounding light conditions to which the eye is exposed, and makes possible the correct determination of the exposure data with a light wedge instrument which is observed with the eye exposed to the surrounding light, under the elimination of an eye-piece. The amount of light or the brightness value of the object, which is read off a light-wedge brightness scale with brightness value marks, is then adjusted over a mark on an exposure data table which describes with more detail the observer's surroundings. It is quite sufficient to classify the various possible visual sensitivities of the eye in 4 to 6 degrees or steps which an observer is able to estimate, and to provide the exposure data table with 4 to 6 eye sensitivity marks, designated by catchwords, such as "Sunny day", "Dull day", "Bright interior" and "Dull interior" corresponding to the different values or degrees of eye sensitivity. On making an observation, the brightness value read off the brightness scale is adjusted over the eye sensitivity mark with the corresponding catchword. The various eye sensitivity marks may be designated by symbols, such as colored fields or sections, instead of by catchwords.

An exposure data table is, as usual, disposed on the exterior of the instrument and contains, in addition to the usual scales of exposure times, diaphragm openings, and the brightness scale marking, the sequence of eye sensitivity marks correlated to the scale of brightness values. The exposure time scale and the eye sensitivity marks are printed on paper or the like, while the scales of the diaphragm openings and the brightness scale marking are placed on a transparent sheet covering the paper scales, or vice versa. The transparent sheet scales are movable over the paper scales, so that by adjusting the brightness value mark read off the light wedge on the proper eye sensitivity mark, as determined from the surrounding light conditions, the corresponding exposure data, that is, the exposure time and the diaphragm opening, appear beside each other.

In other words, in accordance with the invention, the variations of the visual sensitivity of the eye which is exposed to the surrounding light, while making the brightness value readings on the light wedge, are classified into several degrees corresponding to the differences in the light wedge brightness readings made by the eye exposed to different surrounding light conditions. These different degrees of the eye sensitivity have the same ultimate effect on the photographic data obtained with the exposure data table, as the effect of using films of different emulsions speeds or filters using different filter factors. The invention thus compensates for the different predetermined degrees of the visual sensitivity of the eye, by combining with the exposure data table a sequence of eye sensitivity marks, designated, for instance, by catchwords "Sunny day", "Dull day", "Bright interior" and "Dull interior" which serve as a corresponding scale of visual sensitivity values so as to compensate for the differences in the visual sensitivity of the exposed eye which makes light wedge reading, in the same way as the differences in the emulsion speed of different films, or the differences of the filter factors of different filters used in making a photograph are compensated for by combining with the exposure data table a film speed scale or filter factor scale, and thereby assure that the total amount of light admitted to the light sensitive emulsion corresponds to the brightness value of the object determined with an eye having a standard sensitivity, for instance, that of the eye exposed to a sunny day.

Accordingly, the provision of additional sequence of eye sensitivity marks which serves as a scale of visual sensitivity values enables compensation for the smaller visual sensitivity of the eye exposed to a dull interior, as compared to its visual sensitivity when exposed to a sunny day, in a way analogous to the compensation for the different film speeds or filter factors, by shifting one of the main exposure data scales, for instance, the scale of stop values, so as to bring its graduations into alignment with smaller exposure times, than for a light wedge reading made with the eye exposed to a sunny day, because the actual brightness value observed on the light wedge by the eye exposed to a dull interior is smaller than it would be if the same object having the same illumination is observed by the eye exposed to a sunny day.

A schematic illustration of a light wedge exposure meter embodying one form of the invention is shown in Figs. 1 to 3. It comprises a casing 30 forming an elongated light passage which extends in the direction of the axis of vision 31 between the eye of the observer and the object against which it is directed. In the blackened interior of the casing at a distance from its ends is mounted a light-wedge 32 marked with brightness-value marks which is so arranged as to enable the focusing of the individual parts of the light wedge 32 when it is held in the normal visual distance of 20 to 30 centimeters from the eyes of the observer.

To eliminate inaccuracies in observing the brightness values on the light-wedge, reflection of light rays by the light-wedge toward the eyes of the observer should be prevented. This may be done by disposing the light-wedge 32 at an angle other than 90 degrees to the axis of vision 31 through the light passage so that light rays reaching the surface of the light-wedge are reflected toward the interior blackened walls of the light passage.

An exposure data table provided on the exterior of the casing 30 comprises a table section formed of a paper sheet 35 mounted on the casing and a table section formed of a transparent sheet 36 which is movable on the paper sheet 35. The exposure data are printed on the two table sections, for instance, the scale of stop values F and the brightness scale marking B are printed on the transparent sheet 36, and on the paper 35 are printed the scale of exposure times T and the scale of eye sensitivity marks S, such as "Sunny day", "Dull day", "Bright interior" and "Dull interior" or fields of different colors. The different scales of the two sheets 35 and 36 are so arranged that by adjusting the brightness value mark of the brightness scale marking B, as determined by a light-wedge reading, on the estimated eye sensitivity mark of the eye sensitivity scale S, the correct combinations of exposure times T and stops F appear beside each other. This arrangement of the scales on the table sections 35 and 36 is shown in Fig. 2, and it differs from similar prior art table arrangements merely by the substitution of the sequence of eye sensitivity marks for the single index mark on the table section having the scale of stops.

In Figs. 4 to 6 is illustrated an exposure meter of the Aiken Patent 1,414,972, which has been modified by discarding its eyepiece and combining with it a visual sensitivity scale in accordance with the principles of the invention.

A true light wedge 37 having a sequence of brightness value areas calibrated as a brightness value scale is mounted on a slider 38 for slidable movement in a casing 39 so as to expose successive areas of the light wedge brightness scale 37 through a viewing opening 40 of the casing to the eye of the observer held at a distance from the casing, so as to enable the eye of the observer to determine the brightness value of the object by adjusting the slider till the light coming from the object through the light passage formed by the viewing opening 40 and the rear opening 41 of the casing ceases to be visible.

Along an edge of the casing is provided a scale of exposure times T for cooperation with a scale of stop values F mounted on the adjacent exposed portion of the slider 38. The light wedge viewing opening 40 of the casing 39, through which the light wedge 37 is viewed, serves as the brightness scale marking of the table for correlating the exposure data of the table with the brightness value read off the light wedge.

As shown in Figs. 4 and 6, the scale of stop values F may be placed on a strip slidably mounted on the exterior of the slider 38 for cooperation with an additional scale of exposure data, such as film-emulsion speeds E, so that by a preliminary adjustment of the upper or lower index edge of the stop scale strip F on the mark of the film speed scale E indicating the speed of the film, it is possible to compensate for the variations in the speeds of the film used for making the photograph. Similarly, the scale of exposure times T may be placed on a strip slidably mounted on the exterior of the casing 39 so that by preliminary adjustment of the lower index edge of the exposure time scale strip T on an underlying filter scale X, engraved on the exterior of the casing, it is possible to compensate for the filter factors of filters used in making the photograph.

In accordance with the invention, such prior art exposure meter from which the eyepiece has been removed is modified by recalibrating one of the scales, such as the film speed scale E or the filter factor scale X, as a visual sensitivity scale, in the way explained hereinabove in connection with Figs. 1 to 3, so as to compensate for the variations in the sensitivity of the observer's eye making the light wedge reading caused by the changes in the surrounding light conditions to which the eye, making the light wedge reading, is exposed. Alternatively, the exposure meter of Figs. 4 to 6 may be provided with an additional slider strip having a lower edge serving as an index adjustably fixed on the filter factor scale X, marked on the exterior of the casing 39, and bearing a sequence of eye sensitivity marks on which the lower index edge of the slider strip T may be adjustably fixed in accordance with the momentary sensitivity of the eye as determined by the brightness condition of the surroundings to which the eye is exposed, in the way explained hereinabove.

The principles underlying the invention as described above and defined by the claims will suggest to those skilled in the art many other ways of designing accurate light wedge exposure meters provided with a light wedge on which the brightness value reading is made by the observer's eye held at a distance from the exposure meter while exposed to the surrounding light.

For instance, as shown in Fig. 7, the end of the light wedge casing 30 may be provided with a slanted mirror 42 so as to enable the exposed eye of the observer to view the light wedge 37 located in the light passage of the casing directed toward the observed object. Similarly, a prior art light wedge exposure meter of the type shown in Fig. 8, as described in U. S. Patent 1,176,349, having a light wedge 44 located in a light passage of a casing 45 and a table of exposure data correlated to the light wedge readings, may be provided with several translucent light screens of decreasing translucency arranged to be tilted into alignment with the light passage for increasing or decreasing the translucency of the light wedge so as to serve as visual sensitivity scale means actuable in predetermined steps to compensate for the changes in the eye sensitivity as determined by the variations in the surrounding light conditions to which the observer's eye is exposed at the time it makes the light wedge reading while exposed to the surrounding light.

It is accordingly desired that the appended claims be construed broadly and that they shall not be limited to the specific details shown and described in connection with the exemplifications thereof.

I claim:

1. In a visual extinction-type exposure meter for enabling an observer to determine the exposure data required for making a photograph of an object, a casing forming a light passage directed toward the object having an end facing the observer, and a light wedge having areas of decreasing translucency calibrated to form a predetermined brightness value scale and located in the interior of the passage so as to enable the observer's eye held at a distance from said casing, at which the eye is exposed to the surrounding light, to read on the light wedge the brightness value of the object, in combination with an exposure data table having a set of stop values, a cooperating set of exposure time values, and a brightness scale marking correlating the exposure data of said table to the brightness value scale of the light wedge, and visual sensitivity scale means actuable in predetermined steps in accordance with a predetermined scale of visual sensitivity values to compensate for the changes in the visual sensitivity of the observer's eye caused by the variations in the surrounding light conditions to which the eye is exposed, for correlating the brightness value reading made by the eye on the light wedge and the exposure data of said table with the momentary visual sensitivity value of the observing eye; so as to indicate on said table, for each brightness value read off by the eye on the light wedge and each momentary visual sensitivity value of the eye, determined by the surrounding light condition to which the eye is exposed, the combinations of exposure data required for making a correct photograph.

2. In a visual extinction-type exposure meter for enabling an observer to determine the exposure data required for making a photograph of an object, a casing forming a light passage directed toward the object having an end facing the observer and a light wedge having areas of decreasing translucency calibrated to form a predetermined brightness value scale and located in the interior of the passage so as to enable the observer's eye held at a distance from said casing, at which the eye is exposed to the surrounding light, to read on the light wedge the brightness value of the object, in combination with an exposure data table having a set of stop values, a cooperating set of exposure time values, and a brightness scale marking correlating the exposure data of said table to the brightness value scale of the light wedge, and a series of areas calibrated to form a scale of visual sensitivity values corresponding in predetermined steps to the changes in the visual sensitivity of the observer's eye caused by the variations in the surrounding light conditions to which the eye is exposed, said scale of visual sensitivity values being so arranged and correlated to said sets of exposure data and said brightness scale marking as to compensate in predetermined steps for the changes in the visual sensitivity of the observer's eye caused by the variations in the surrounding light conditions to which the eye is exposed, and to give on said table, for each brightness value reading on the light wedge and for each momentary visual sensitivity value determined by the surrounding light conditions to which the eye is exposed, the combinations of exposure data required for making a correct photograph.

3. In a visual extinction-type exposure meter for enabling an observer to determine the exposure data required for making a photograph of an object, a casing forming a light passage directed toward the object having an end facing the observer, and a light wedge having areas of decreasing translucency calibrated to form a predetermined brightness value scale and located in the interior of the passage so as to enable the observer's eye held at a distance from said casing, at which the eye is exposed to the surrounding light, to read on the light wedge the brightness value of the object, in combination with an exposure data table formed of two relatively movable table sections having a set of stop values, a cooperating set of exposure time values, and a brightness scale marking correlating the exposure data of said table to the brightness value scale of the light wedge, and a series of areas calibrated to form a scale of visual sensitivity values corresponding in predetermined steps to the changes in the visual sensitivity of the observer's eye caused by the variations in the surrounding light conditions to which the eye is exposed, said scale of visual sensitivity values being so arranged and correlated to said sets of exposure data and said brightness scale marking as to compensate in predetermined steps for the changes in the visual sensitivity of the observer's eye caused by the variations in the surrounding light conditions to which the eye is exposed, and to give on said table, for each brightness value reading on the light wedge and for each momentary visual sensitivity value determined by the surrounding light conditions to which the eye is exposed, the combinations of exposure data required for making a correct photograph.

4. In a visual extinction-type exposure meter for enabling an observer to determine the exposure data required for making a photograph of an object, a casing forming a light passage directed toward the object having an end facing the observer and a light wedge having areas of decreasing translucency calibrated to form a predetermined brightness value scale and located in the interior of the passage so as to enable the observer's eye held at a distance from said casing, at which the eye is exposed to the surrounding light, to read on the light wedge the brightness value of the object, in combination with an exposure data table comprising a first table section having one scale of exposure data and a brightness scale marking correlating the exposure data of said table to the brightness value scale of the light wedge, a second table section having another scale of exposure data cooperating with said one scale of exposure data, and a series of areas calibrated to form a scale of visual sensitivity values corresponding in predetermined steps to the changes in the visual sensitivity of the observer's eye caused by the variations in the surrounding light conditions to which the eye is exposed, said table sections being relatively movable, and said scale of visual sensitivity values being so arranged and correlated to said sets of exposure data and said brightness scale marking as to compensate in predetermined steps for the changes in the visual sensitivity of the observer's eye caused by the variations in the surrounding light conditions to which the eye is exposed, and to give on said table, for each brightness value reading on the light wedge and for each momentary visual sensitivity value determined by the surrounding light conditions to which the eye is exposed, the combinations of exposure data required for making a correct photograph.

5. In a visual extinction-type exposure meter for enabling an observer to determine the exposure data required for making a photograph of an object, a casing forming a light passage directed toward the object having an end facing the observer, and a light wedge having areas of decreasing translucency calibrated to form a predetermined brightness value scale and located in the interior of the passage so as to enable the observer's eye held at a distance from said casing, at which the eye is exposed to the surrounding light, to read on the light wedge the brightness value of the object, in combination with an exposure data table having a set of stop values, a cooperating set of exposure time values, and a brightness scale marking correlating said exposure data to the brightness value scale of the light wedge, and visual sensitivity scale means actuable in predetermined steps in accordance with a predetermined scale of visual sensitivity values to compensate for the changes in the visual sensitivity of the observer's eye caused by the variations in the surrounding light conditions to which the eye is exposed, for correlating the brightness value reading made by the eye on the light wedge and the exposure data of said table with the momentary visual sensitivity value of the observing eye, so as to indicate on said table, for each brightness value read off by the eye on the light wedge and each momentary visual sensitivity value of the eye determined by the surrounding light condition to which the eye is exposed the combinations of exposure data required for making a correct photograph, said light passage being so shaped and said light wedge being so arranged within said passage as to prevent light reaching the light passage through the end of the passage facing the observer from being reflected to the eye of the observer.

6. In a visual extinction-type exposure meter for enabling an observer to determine the exposure data required for making a photograph of an object, a casing forming a light passage directed toward the object having an end facing the observer, and a light wedge having areas of decreasing translucency calibrated to form a predetermined brightness value scale and located in the interior of the passage so as to enable the observer's eye held at a distance from said casing, at which the eye is exposed to the surrounding light, to read on the light wedge the brightness value of the object, in combination with an exposure data table having a set of stop values, a cooperating set of exposure time values, and a brightness scale marking correlating the exposure data of said table to the brightness value scale of the light wedge, and a series of areas calibrated to form a scale of visual sensitivity values corresponding in predetermined steps to the changes in the visual sensitivity of the observer's eye caused by the variations in the surounding light conditions to which the eye is exposed, said scale of visual sensitivity values being so arranged and correlated to said sets of exposure data and said brightness scale marking as to compensate in predetermined steps for the changes in the visual sensitivity of the observer's eye caused by the variations in the surrounding light conditions to which the eye is exposed and to give on said table, for each brightness value reading on the light wedge and for each momentary visual sensitivity value determined by the surrounding light conditions to which the eye is exposed, the combinations of exposure data required for making a correct photograph, said light passage being so shaped and said light wedge being so arranged within said passage as to prevent light reaching the light passage through the end of the passage facing the observer from being reflected to the eye of the observer.

7. In a visual extinction-type exposure meter for enabling an observer to determine the exposure data required for making a photograph of an object, a casing forming a light passage directed toward the object having an end facing the observer, and a light wedge having areas of decreasing translucency calibrated to form a predetermined brightness value scale and located in the interior of the passage so as to enable the observer's eye held at a distance from said casing, at which the eye is exposed to the surrounding light, to read on the light wedge the brightness value of the object, in combination with an exposure data table having a set of stop values, a cooperating set of exposure time values, and a brightness scale marking correlating the exposure data of said table to the brightness value scale of the light wedge, and visual sensitivity scale means actuable in predetermined steps in accordance with a predetermined scale of visual sensitivity values to compensate for the changes in the visual sensitivity of the observer's eye caused by the variations in the surrounding light conditions to which the eye is exposed, for correlating the brightness value reading made by the eye on the light wedge and the exposure data of said table with the momentary visual sensitivity value of the observing eye, so as to indicate on said table, for each brightness value read off by the eye on the light wedge and each momentary visual sensitivity value of the eye determined by the surrounding light condition to which the eye is exposed the combinations of exposure data required for making a correct photograph, said light passage being so shaped and said light wedge being so arranged within and sufficiently inclined to the axis of vision through said light passage as to prevent light reaching the light passage through the end of the passage facing the observer from being reflected to the eye of the observer.

ALOIS LEBER.